US008745810B2

(12) United States Patent
Hojnacki et al.

(10) Patent No.: US 8,745,810 B2
(45) Date of Patent: Jun. 10, 2014

(54) PIVOT BODY FOR WINDSHIELD WIPER SYSTEM

(75) Inventors: George Hojnacki, Commerce, MI (US); James O'Connor, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 387 days.

(21) Appl. No.: 12/946,376

(22) Filed: Nov. 15, 2010

(65) Prior Publication Data

US 2012/0117747 A1 May 17, 2012

(51) Int. Cl.
*B60S 1/32* (2006.01)
*B60S 1/38* (2006.01)

(52) U.S. Cl.
USPC ........................................ 15/250.31

(58) Field of Classification Search
None
See application file for complete search history.

(56) References Cited

U.S. PATENT DOCUMENTS

| | | | |
|---|---|---|---|
| 3,910,652 A | 10/1975 | Riester et al. ................ 308/26 |
| 5,873,280 A | 2/1999 | Kanazawa | |
| 6,216,309 B1 | 4/2001 | Goto et al. ................ 15/250.31 |
| 6,317,918 B1 | 11/2001 | Kagawa et al. ............ 15/250.31 |
| 6,347,427 B2 | 2/2002 | Kobayashi et al. ........ 15/250.31 |
| 6,505,376 B1 | 1/2003 | Kagawa ..................... 15/250.31 |
| 6,532,616 B1 | 3/2003 | Eustache ................... 15/250.31 |
| 6,568,023 B2 | 5/2003 | Perin et al. .................. 15/250.3 |
| 6,718,592 B2 | 4/2004 | Ohashi et al. .............. 15/250.31 |
| 6,901,623 B2 | 6/2005 | Ohashi et al. .............. 15/250.31 |
| 7,581,278 B2 | 9/2009 | Zimmer | |
| 2001/0011831 A1* | 8/2001 | Ohashi et al. ............. 296/96.17 |
| 2003/0077013 A1* | 4/2003 | Zimmer ........................ 384/415 |
| 2004/0140687 A1 | 7/2004 | Kalchschmidt et al. ... 296/96.17 |
| 2004/0200025 A1 | 10/2004 | Ohashi et al. | |
| 2005/0039290 A1 | 2/2005 | Morin et al. ................. 15/250.3 |

FOREIGN PATENT DOCUMENTS

| | | |
|---|---|---|
| DE | 103 36 208 | 3/2005 |
| EP | 0852195 A1 | 7/1998 |
| EP | 1 040 972 A2 | 10/2000 |
| FR | 0115886 | 12/2001 |
| GB | 2 347 340 A | 9/2000 |
| GB | 2 424 823 | 10/2006 |
| WO | WO 03/047926 | 6/2003 |
| WO | WO 2004/113134 | 12/2004 |

OTHER PUBLICATIONS

Jun. 27, 2012 International Search Report (PCT/US2011/060195).

(Continued)

*Primary Examiner* — Monica Carter
*Assistant Examiner* — Stephanie Berry
(74) *Attorney, Agent, or Firm* — Howard & Howard Attorneys PLLC

(57) ABSTRACT

A polymeric pivot body for a windshield wiper system includes a bracket portion adapted to attach a pivot shaft assembly of a windshield wiper system to a portion of a vehicle and a sleeve portion connected to the bracket portion for receiving and orientating a pivot shaft of the pivot shaft assembly. The pivot body also includes a tube receiving portion connected to and extending outwardly from the sleeve portion for receiving one end of a unitizing tube of a linkage assembly to interconnect the unitizing tube to the pivot shaft assembly. The pivot body further includes at least one I-beam portion interconnecting the sleeve portion and the tube receiving portion in a cost-effective manner while having a lighter weight and reduced stresses, and uses no tools for assembly of the windshield wiper system.

8 Claims, 4 Drawing Sheets

(56) References Cited

OTHER PUBLICATIONS

Fredriksson R., Haland Y., Yang J., Evaluation of a new pedestrian head injury protection system with a sensor in the bumper and lifting of the bonnet's rear edge, Paper No. 131, 17th International Conference on the Enhanced Safety of Vehicles (ESV), Jun. 2001, Amsterdam, Holland.

Apr. 4, 2008 "Patents Act 1977 Examination Report under Section 18(3)" for Application No. GB0606700.3.

Sep. 11, 2008 "Response to Apr. 4, 2008 Official Communication" for Application No. GB0606700.3.

Nov. 4, 2008 "Patents Act 1977 Examination Report under Section 18(3)" for Application No. GB0606700.3.

Jan. 6, 2009 "Response to Examination Report" for Application No. GB0606700.3.

Sep. 17, 2009 "Election/Restriction Requirement" for U.S. Appl. No. 11/397,049.

Sep. 28, 2009 "Response to Requirement for Election/Restriction" for U.S. Appl. No. 11/397,049.

Dec. 23, 2009 "Office Action" for U.S. Appl. No. 11/397,049.

* cited by examiner

PIVOT BODY FOR WINDSHIELD WIPER SYSTEM

BACKGROUND OF THE INVENTION

1. Field of the Invention

The present invention relates, generally, to windshield wiper systems, and more specifically, to a pivot body for a windshield wiper system having a lighter weight and reduced stresses, and uses no tools for assembly.

2. Description of the Related Art

Conventional windshield wiper systems known in the related art include some type of wiper blade assembly mounted to an arm which, in turn, is mounted adjacent the windshield and pivotally driven to impart reciprocal motion to the wiper blade assembly across the windshield. A rubber wiping element is supported by the blade assembly and contacts the windshield across the surface to be wiped. In addition, these windshield wiper systems include a linkage assembly interposed between an electrical wiper motor and the wiper arms for translating rotational movement of the motor into pivotal movement of the wiper arm across the windshield. The windshield wiper systems include a connection between the linkage assembly and the wiper arm.

While windshield wiper systems known in the related art have generally worked for their intended purposes, there is an ongoing effort to provide a lighter weight connection with improved structural rigidity and strength, which have heretofore not been obvious to persons having ordinary skill in the art.

SUMMARY OF THE INVENTION

The present invention overcomes the disadvantages in the related art in a polymeric pivot body for a windshield wiper system including a bracket portion adapted to attach a pivot shaft assembly of a windshield wiper system to a portion of a vehicle and a sleeve portion connected to the bracket portion for receiving and orientating a pivot shaft of the pivot shaft assembly. The pivot body also includes a tube receiving portion connected to and extending outwardly from the sleeve portion for receiving one end of a unitizing tube of a linkage assembly to interconnect the unitizing tube to the pivot shaft assembly. The pivot body further includes at least one I-beam portion interconnecting the sleeve portion and the tube receiving portion.

The present invention also overcomes the disadvantages in the related art in a pivot shaft assembly for a windshield wiper system including a metallic pivot shaft for rotating a wiper arm of a windshield wiper system, a polymeric pivot body for receiving and orientating the pivot shaft, and a metallic unitizing tube of a linkage assembly connected to the pivot body. The pivot body includes a bracket portion adapted to attach the pivot shaft assembly to a portion of a vehicle, a sleeve portion connected to the bracket portion to receive the pivot shaft, a tube receiving portion connected to and extending outwardly from the sleeve portion and connected to one end of the unitizing tube, and at least one I-beam portion interconnecting the sleeve portion and the tube receiving portion.

The present invention also overcomes the disadvantages in the related art in a windshield wiper system including an electrical wiper motor, a wiping arm having a wiping element adapted to contact a surface to be wiped, a pivot shaft assembly having a metallic pivot shaft connected to the wiping arm, and a linkage assembly interposed between the wiper motor and the pivot shaft assembly for translating rotational movement of the wiper motor into pivotal movement of the wiper arm across the windshield. The linkage assembly includes a metallic unitizing tube for connection to the pivot shaft assembly and the pivot shaft assembly including a polymeric pivot body receiving and orientating the pivot shaft and connected to the unitizing tube and adapted to be connected to portion of a vehicle. The pivot body includes a bracket portion adapted to attach the pivot shaft assembly to the portion of the vehicle, a sleeve portion connected to the bracket portion to receive the pivot shaft, and a tube receiving portion connected to and extending outwardly from the sleeve portion and connected to one end of the unitizing tube. The pivot body also includes at least one I-beam portion interconnecting the sleeve portion and the tube receiving portion in a cost-effective manner while having a lighter weight and reduced stresses, and uses no tools for assembly of the windshield wiper system.

BRIEF DESCRIPTION OF THE DRAWINGS

Other objects, features and advantages of the present invention will be readily appreciated as the same becomes better understood after reading the subsequent description taken in connection with the accompanying drawings wherein.

DETAILED DESCRIPTION OF THE PREFERRED EMBODIMENT(S)

Figure 1:
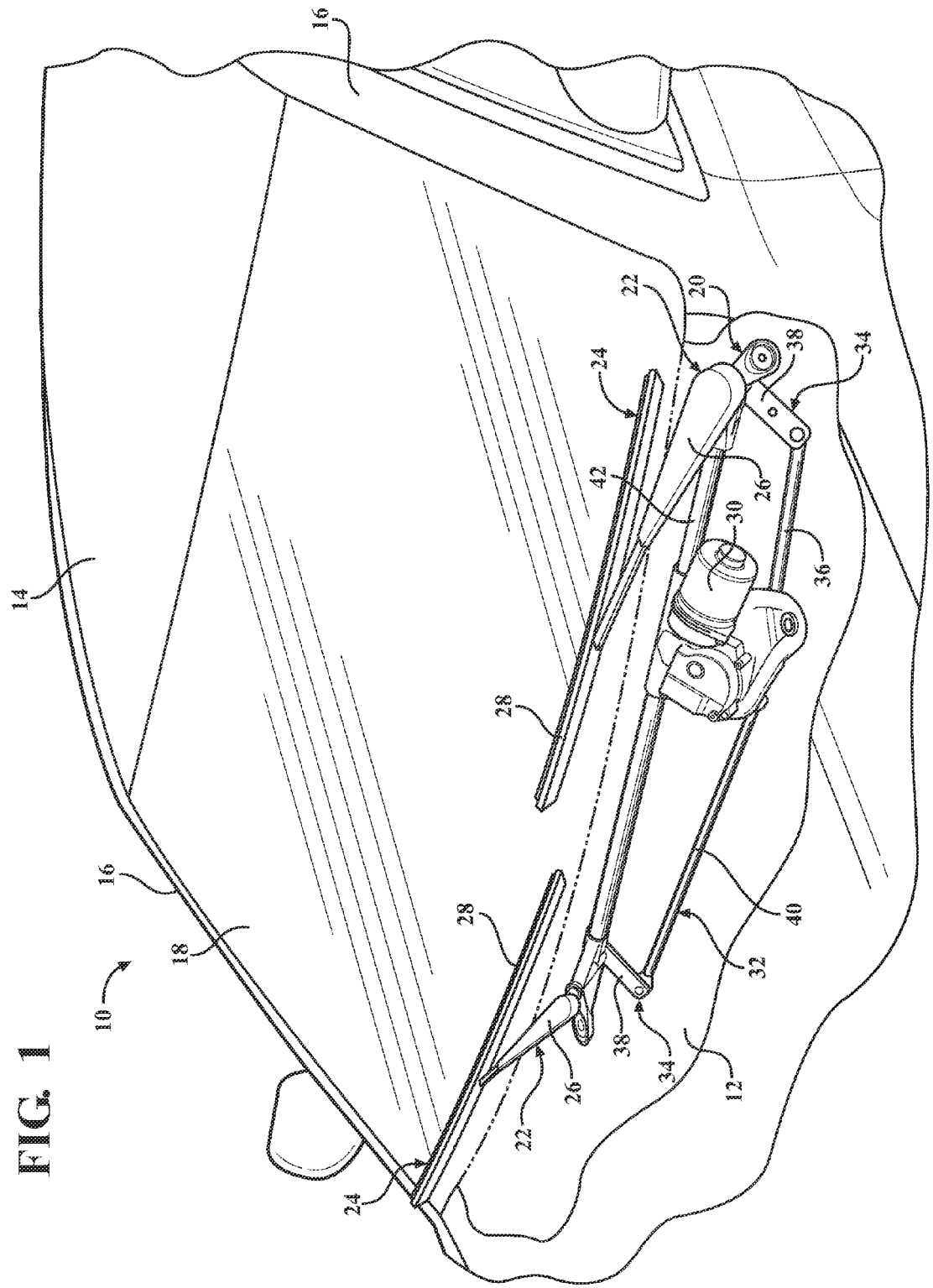
FIG. 1 is a partial perspective view of the front of an automotive vehicle having a windshield wiper system, according to one embodiment of the present invention, including a pair of windshield wiper assemblies pivotally mounted for reciprocal movement across the windshield of the vehicle.

Referring now to the figures, where like numerals are used to designate like structure, a portion of a vehicle is illustrated at 10 in FIG. 1. The vehicle body includes a cowl 12, a roof 14, and a pair of laterally spaced front or "A" pillars 16 extending between the roof 14 and the cowl 12. The A-pillars 16, roof 14, and cowl 12 cooperate to define a generally rectangular perimeter, which supports a curved or "swept back" windshield 18.

A windshield wiper system, according to the present invention, is generally indicated at 20 in FIG. 1 and is employed to clean the glass windshield 18. The windshield wiper system 20 includes a pair of wiper assemblies, generally indicated at 22, and which correspond to the driver and passenger side of the vehicle 10. Each windshield wiper assembly 22 (hereinafter "wiper assembly") is carried by a corresponding wiper arm assembly, generally indicated at 24. The wiper arm assembly 24 includes a wiper arm 26 having one end with an attachment member (not shown but generally known in the art) adapted to operatively engage a wiper assembly 22 and another end pivotally mounted to a linkage assembly, as will be described in greater detail below. The wiper arm assembly 24 is adapted to facilitate the oscillating movement of the wiper assembly 22 across the windshield 18 and may include a biasing member (not shown) such as a spring, which creates a force that is distributed to a wiper element 28 of the wiper assembly 22 to clean the windshield 18. The remaining components of the wiper system 20 are not visible from the exterior of the vehicle 10. Rather, the remaining components are generally located within the engine compartment and concealed by the cowl 12 or other portions of the vehicle body.

While the wiper assembly 22 illustrated in FIG. 1 is shown in connection with the front windshield 18 of the vehicle 10, those having ordinary skill in the art will appreciate that wiper assemblies 22 may be employed in other areas of a vehicle 10, such as a rear window (not shown) or a head lamp (not shown) that employs a wiper system 20. Thus, it will be understood that the present invention is not limited for use solely in connection with wiper arm assemblies 24 and windshield wiper assemblies 22 adapted for use on a vehicle's windshield 18, but for use in all applications where wiper arm assemblies 24 and wiper assemblies 22 are employed.

Referring again to FIG. 1, the wiper system 20 further includes an electrical wiper motor 30 and a linkage assembly, generally indicated at 32. The linkage assembly 32 is interposed between the electrical wiper motor 30 and the wiper arm assemblies 24 for translating rotational movement of the motor 30 into pivotal movement of the wiper arm 26 across the windshield 18. The linkage assembly 32 includes a pivot shaft assembly, generally indicated at 34. The pivot shaft assembly 34 is adapted to operatively receive one end of the wiper arm 26. Accordingly, the number of pivot shaft assemblies 34 corresponds to the number of wiper arms 26 within the system 20. The linkage assembly 32 may further include a drive arm 36 operatively attached to the pivot shaft assembly 34 corresponding to the driver's side wiper arm 26 through a pivot lever 38. It should be appreciated that, in the embodiment illustrated, the linkage assembly 32 may further include a passenger arm 40 operatively attached to the pivot shaft assembly 34 corresponding to the passenger's side wiper arm 26 through a pivot lever 38 to power the passenger's side wiper assembly 24.

The linkage assembly 32 also includes a unitizing or cross tube 42 extending between the pivot shaft assemblies 34 corresponding to the driver and passenger side wiper arms 26. The unitizing tube 42 is made of a metallic material and has a generally circular cross-sectional shape, but may have any suitable cross-sectional shape. Those having ordinary skill in the art will appreciate that the linkage assembly 32 may take any number of different configurations or may be substantially eliminated in favor of a motor used to directly drive each wiper assembly 24 through the pivot shaft assemblies 34. Those having ordinary skill in the art will also appreciate that the electrical wiper motor 30 is generally known in the art and is typically employed to power the wiper system 20 to move the windshield wiper assemblies 22 in an oscillating manner across the surface of the windshield 18.

Figure 2:
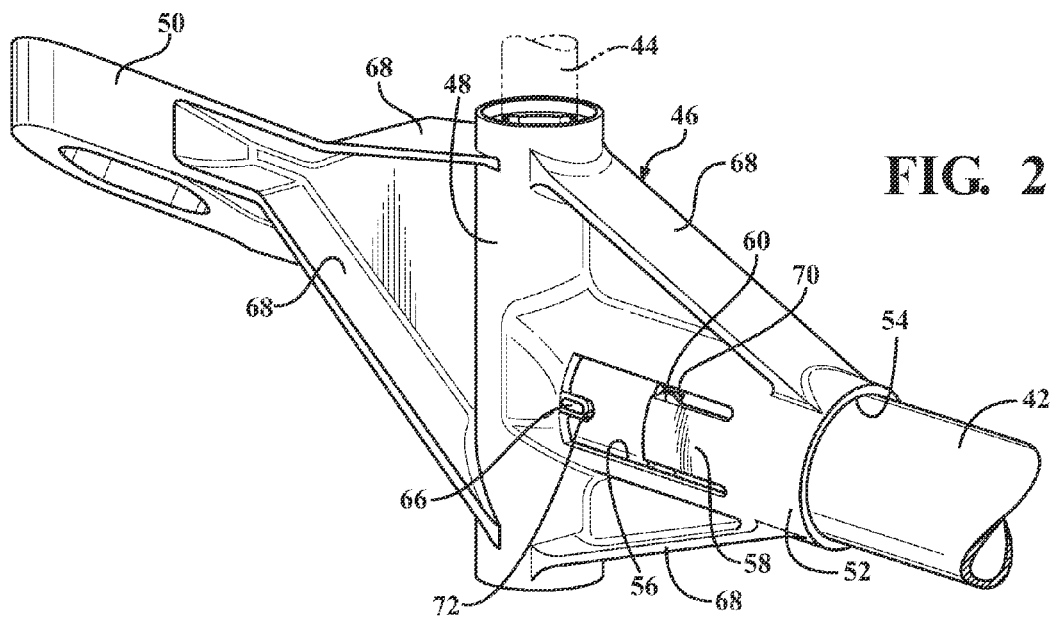
FIG. 2 is a perspective view of a portion of the windshield wiper system according to one embodiment of the present invention.
Figure 3:
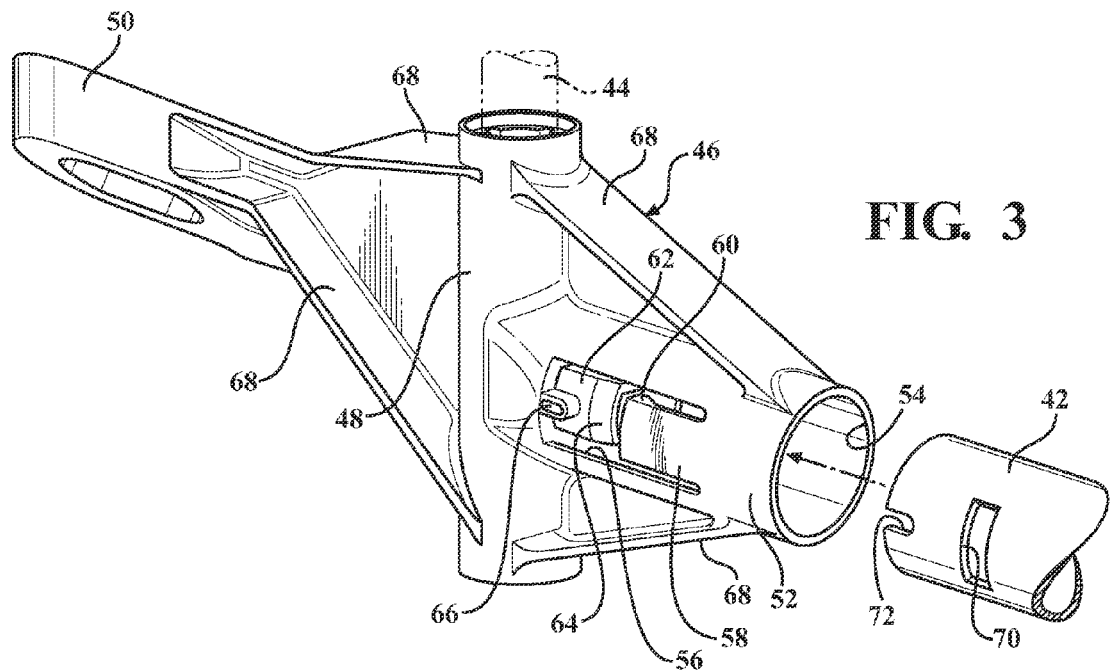
FIG. 3 is an exploded view of the portion of the windshield wiper system of FIG. 2.
Figure 4:
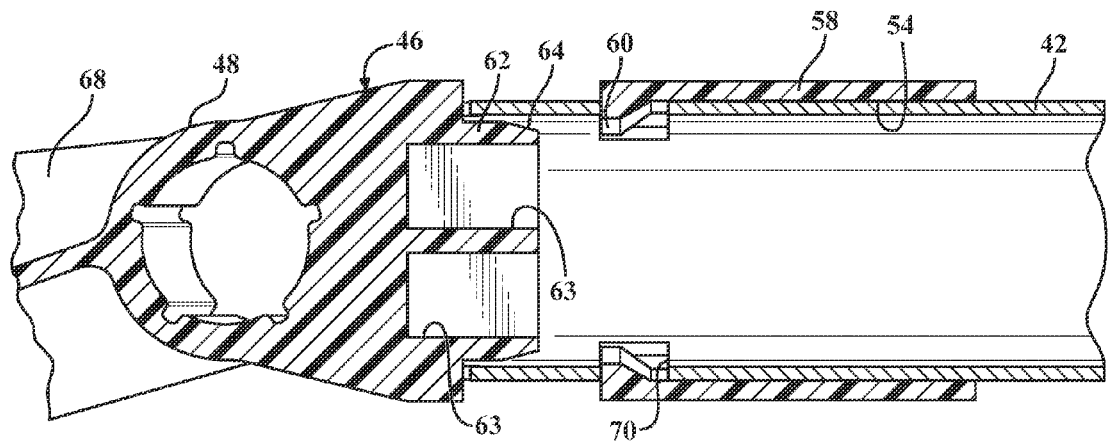
FIG. 4 is a fragmentary view of the portion of the windshield wiper system of FIG. 2.

Referring to FIGS. 2 through 4, the pivot shaft assembly 34 includes a pivot shaft, generally indicated at 44, and a pivot body, according to the present invention and generally indicated at 46, through which the pivot shaft 44 is oriented. The pivot shaft 44 includes a base portion (not shown) that is mounted to the pivot lever 38. The pivot shaft 44 further includes a pivot head (not shown) that is adapted to engage a portion of the wiper arm 26. The orientation of the pivot shaft 44 relative to the pivot body 46 is adapted to provide rotational movement of the pivot shaft 44 within the pivot body 46 to direct the wiper arm 26 in an oscillating manner across the windshield 18. Specifically, the pivot body 46 remains stationary, fixed to the unitizing tube 42, and the base of the pivot shaft 44 is secured to the pivot lever 38. As the drive arm 36 actuates the pivot lever 38, the pivot shaft 44 rotates within the pivot body 46, thereby moving the wiper arm 26. As is commonly known in the art, the pivot shaft 44 rotates within a field of lubricant, such as grease, that is packed within the pivot body 46 to reduce friction between the pivot shaft 44 and pivot body 46 during rotational operation. The pivot shaft 44 is made of a metallic material and has a generally circular cross-sectional shape, but may have any suitable cross-sectional shape for attachment to the wiper arm 26. It should be appreciated that, except for the pivot body 46, the pivot shaft assembly 34 is known in the art.

The pivot body 46 includes a sleeve portion 48 extending axially to receive the pivot shaft 44 therein. The sleeve portion 48 is generally cylindrical and circular in cross-sectional shape, but may have any suitable shape. The pivot body 46 also includes a bracket portion 50 extending outwardly from the sleeve portion 48 to operatively secure the linkage assembly 32 to the vehicle 10. The bracket portion 50 is used to engage a portion of the vehicle 10. More specifically, the bracket portion 50 is adapted to be operatively attached to a portion of a vehicle in an under-mount manner. As shown throughout the Figures, the bracket portion 50 is adapted to be operatively secured to the underside of a transversely extending portion of the body of a vehicle 10. However, those having ordinary skill in the art will appreciate that the bracket portion 50 may be operatively attached to any portion of the vehicle 10. By way of example, the bracket portion 50 may be attached to a portion of the engine plenum (not shown).

The pivot body 46 further includes a tube receiving portion 52 extending radially from the sleeve portion 48 to receive one end of the unitizing tube 42. The tube receiving portion 52 is generally cylindrical and circular in cross-sectional shape, but may have any suitable shape to receive the unitizing tube 42. The tube receiving portion 52 has a cavity 54 to receive one end of the unitizing tube 42. The tube receiving portion 52 also includes a pair of opposed openings 56 extending axially and communicating with the cavity 54 to form a finger portion 58 extending axially therein. The finger portion 58 includes a flange portion 60 extending radially into the cavity 54 to engage the unitizing tube 42 in a manner to be described.

The pivot body 46 also includes a stem or spigot portion 62 extending axially into the cavity 54 of the tube receiving portion 52. The stem portion 62 is generally cylindrical in shape and has a diameter less than the inside diameter of the unitizing tube 42 to be received inside of the unitizing tube 42. The stem portion 62 may have a pair of cavities 63 extending axially therein. The stem portion 62 has a chamfer 64 at the end thereof for guiding the unitizing tube 42 onto the stem portion 62. The stem portion 62 includes a pair of opposed locating portions 66 to engage the unitizing tube 42 to prevent rotation of the unitizing tube 42 relative to the stem portion 62. The locating portions 66 extend radially and axially to be received in corresponding slots or notches in one end of the unitizing tube 42 in a manner to be described.

The pivot body 46 further includes at least one, preferably a pair of I-beam portions 68 connected to and extending between the sleeve portion 48 and the tube receiving portion 52 to strengthen the interface between the unitizing tube 42 and the pivot body 46. The pivot body 46 also includes at least one, preferably a pair of I-beam portions 68 connected to and extending between the sleeve portion 48 and the bracket portion 50 to strengthen the interface between the pivot body 46 and the vehicle body.

The pivot body 46 is made of a polymeric material. The sleeve portion 48, bracket portion 50, tube receiving portion 52, stem portion 62, and I-beam portions 68 are integral, unitary, and formed as one-piece.

In addition, the unitizing tube 42 has a pair of opposed openings or windows 70 near one end thereof. The openings 70 are generally rectangular in shape and extend circumferentially and radially through a wall of the unitizing tube 42. The openings 70 may have any suitable shape to receive the flange portions 60 of the finger portions 58. The unitizing tube 42 also has a pair of opposed slots or notches 72 extending axially into one end of the unitizing tube 42. The slots 72 are generally U-shaped, but may have any suitable shape to receive the locating portions 66 of the stem portion 62.

To assemble the unitizing tube 42 to the pivot body 46, the unitizing tube 42 is inserted into the cavity 54 of the tube receiving portion 52 of the pivot body 46. The unitizing tube 42 is pushed axially into the cavity 54 over the stem portion 62 until the locating portions 66 are received in the slots 72 of the unitizing tube 42. Concurrently, the unitizing tube 42 engages the flange portions 60 of the finger portions 58 to deflect the finger portions 58 radially outwardly. Once the openings 70 in the unitizing tube 42 are aligned with the flange portions 60, the finger portions 58 deflect radially inwardly such that the flange portions 60 extend through the openings 70. In this position, the unitizing tube 42 is secured to the pivot body 46.

Figure 5:
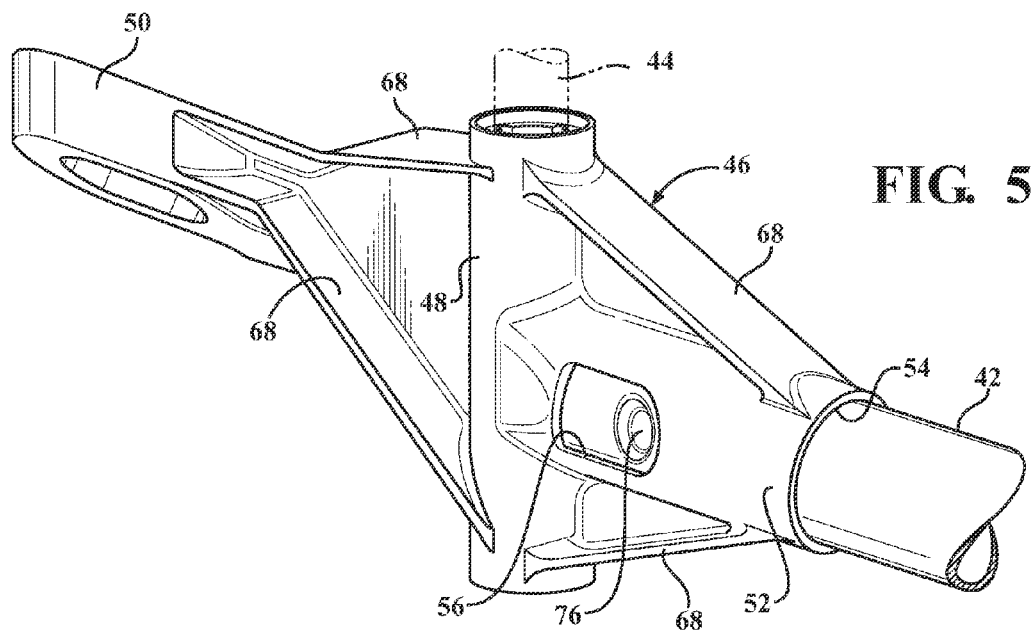
FIG. 5 is a perspective bottom view of another embodiment of the portion of the windshield wiper system according to the present invention.
Figure 6:
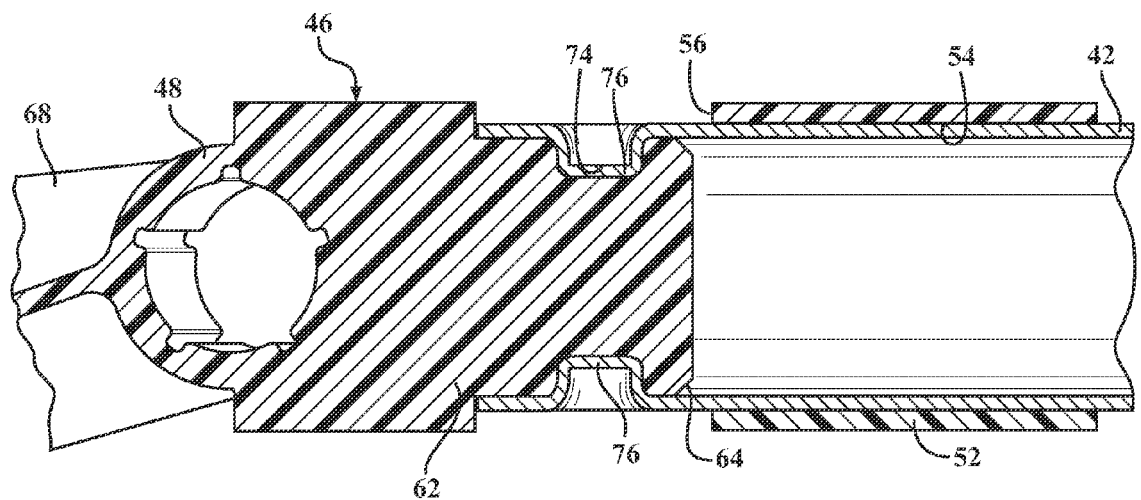
FIG. 6 is a fragmentary view of the portion of the windshield wiper system of FIG. 5.

Alternatively, and in the operative embodiment illustrated in FIGS. 5 and 6, the tube receiving portion 52 eliminates the finger portions extending into the openings 56. The stem portion 62 also eliminates the locating portions, but includes an annular groove 74 extending radially inwardly. To assemble the unitizing tube 42 to the pivot body 46, the unitizing tube 42 is inserted into the cavity 54 of the tube receiving portion 52 of the pivot body 46. The unitizing tube 42 is pushed axially into the cavity 54 over the stem portion 62. The unitizing tube 42 is then crimped through the openings 56 in the tube receiving portion 52 such that opposed portions of the unitizing tube 42 are disposed in the annular groove 74. In this position, the unitizing tube 42 is secured to the pivot body 46.

Accordingly, the present invention provides a pivot body that is light weight, reduces stresses, has inside and outside positive connections with the sleeve portion, and does not require tools for assembly. The pivot body captures the outside of the unitizing tube with a tube receiving portion reinforced by an I-beam portion thereby greatly strengthening the interface with the tube and the pivot body.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A polymeric pivot body for a windshield wiper system comprising:
   a bracket portion adapted to attach a pivot shaft assembly of a windshield wiper system to a portion of a vehicle;
   a sleeve portion connected to the bracket portion for receiving and orientating a pivot shaft of the pivot shaft assembly;
   a tube receiving portion connected to and extending outwardly from said sleeve portion and having a cavity extending axially therein for receiving one end of a unitizing tube of a linkage assembly to interconnect the unitizing tube to the pivot shaft assembly; and
   a pair of I-beam portions connected to and extending between said sleeve portion and said tube receiving portion to strengthen an interface between the unitizing tube and the pivot shaft.

2. A polymeric pivot body for a windshield wiper system comprising:
   a bracket portion adapted to attach a pivot shaft assembly of a windshield wiper system to a portion of a vehicle;
   a sleeve portion connected to the bracket portion for receiving and orientating a pivot shaft of the pivot shaft assembly;
   a tube receiving portion connected to and extending outwardly from said sleeve portion for receiving one end of a unitizing tube of a linkage assembly to interconnect the unitizing tube to the pivot shaft assembly;
   at least one I-beam portion interconnecting said sleeve portion and said tube receiving portion; and
   wherein said tube receiving portion has a pair of opposed openings extending therethrough.

3. The pivot body as set forth in claim 2 wherein said tube receiving portion has a finger portion extending axially into each of said openings.

4. The pivot body as set forth in claim 3 wherein said finger portion has a flange portion extending radially and adapted to be disposed in an opening of the unitizing tube.

5. The pivot body as set forth in claim 2 wherein said tube receiving portion has a cavity extending axially therein to receive one end of the unitizing tube.

6. A polymeric pivot body for a windshield wiper system comprising:
   a bracket portion adapted to attach a pivot shaft assembly of a windshield wiper system to a portion of a vehicle;
   a sleeve portion connected to the bracket portion for receiving and orientating a pivot shaft of the pivot shaft assembly;
   a tube receiving portion connected to and extending outwardly from said sleeve portion for receiving one end of a unitizing tube of a linkage assembly to interconnect the unitizing tube to the pivot shaft assembly;
   at least one I-beam portion interconnecting said sleeve portion and said tube receiving portion;
   wherein said tube receiving portion has a cavity extending axially therein to receive one end of the unitizing tube; and
   wherein said tube receiving portion includes a stem portion extending into said cavity and adapted to be received within the unitizing tube.

7. The pivot body as set forth in claim 6 wherein said stem portion includes a pair of opposed locating portions extending radially and axially and adapted to be disposed in opposed slots in one end of the unitizing tube.

8. The pivot body as set forth in claim 6 wherein said stem portion has an annular groove extending therein and adapted to receive a crimped portion of the unitizing tube.

* * * * *